United States Patent [19]

Geisel et al.

[11] Patent Number: 4,699,575

[45] Date of Patent: Oct. 13, 1987

[54] ADHESIVE PUMP AND IT'S CONTROL SYSTEM

[75] Inventors: Donald J. Geisel, Clifton Park; C. Alan Crotty, Niskayuna; Richard J. Pilarski, Saratoga Springs, all of N.Y.

[73] Assignee: Robotics, Inc., Ballston Spa, N.Y.

[21] Appl. No.: 828,870

[22] Filed: Feb. 12, 1986

[51] Int. Cl.⁴ .......................... F04C 2/18; F04C 13/00; F16C 33/10; F16J 15/24

[52] U.S. Cl. ..................... 418/104; 418/131; 418/206; 277/27; 277/205; 384/291; 384/400

[58] Field of Search ............... 418/102, 104, 83, 131, 418/205, 206; 384/152, 292, 398, 399, 291, 400; 277/165, 212 F, 212 R, 167, DIG. 8, 203, 135, 27, 205; 118/696, 697, 698, 410, 704; 425/376 B; 222/52, 63; 239/184–186, 225.1, 587; 901/41, 43

[56] References Cited

U.S. PATENT DOCUMENTS

| | | | |
|---|---|---|---|
| 1,961,029 | 5/1934 | Benedek | 384/292 |
| 1,972,565 | 9/1934 | Kempton | 418/104 |
| 2,547,374 | 4/1951 | Carideo | 418/104 |
| 2,957,428 | 10/1960 | Meyer et al. | 418/206 |
| 2,986,096 | 5/1961 | Booth et al. | 418/102 |
| 2,988,009 | 6/1961 | Kraissl, Jr. | 418/206 |
| 3,173,374 | 3/1965 | Beimfohr | 418/206 |
| 3,528,756 | 9/1970 | Norlin et al. | 418/73 |
| 3,830,602 | 8/1974 | Boop et al. | 418/131 |
| 4,174,846 | 11/1979 | Scott | 277/205 |
| 4,336,213 | 6/1982 | Fox | 264/40.1 |
| 4,381,127 | 4/1983 | Visser | 384/399 |
| 4,431,690 | 2/1984 | Matt et al. | 427/424 |
| 4,564,410 | 1/1986 | Clitheros et al. | 118/697 |
| 4,584,964 | 4/1986 | Engel | 118/696 |

FOREIGN PATENT DOCUMENTS

| | | | |
|---|---|---|---|
| 19735 | of 1915 | United Kingdom | 384/398 |
| 762958 | 12/1956 | United Kingdom | 277/165 |

Primary Examiner—John J. Vrablik
Attorney, Agent, or Firm—Charles W. Helzer

[57] ABSTRACT

An improved adhesive pump and pump control system for automatically changing the flow rate of adhesive materials being dispensed onto a workpiece in conformance with changes in movement of a robot controlled adhesive dispensing nozzle used to apply adhesive materials automatically onto the surface of the workpiece in accordance with a predetermined pattern. The system includes an improved adhesive gear pump having a novel sealing arrangement which employs lubricant grease supplied under pressure for preventing leakage of the adhesive along the shaft into the bearings of the pump thereby assuring long and reliable operating life for the pump under normal operating conditions.

13 Claims, 9 Drawing Figures

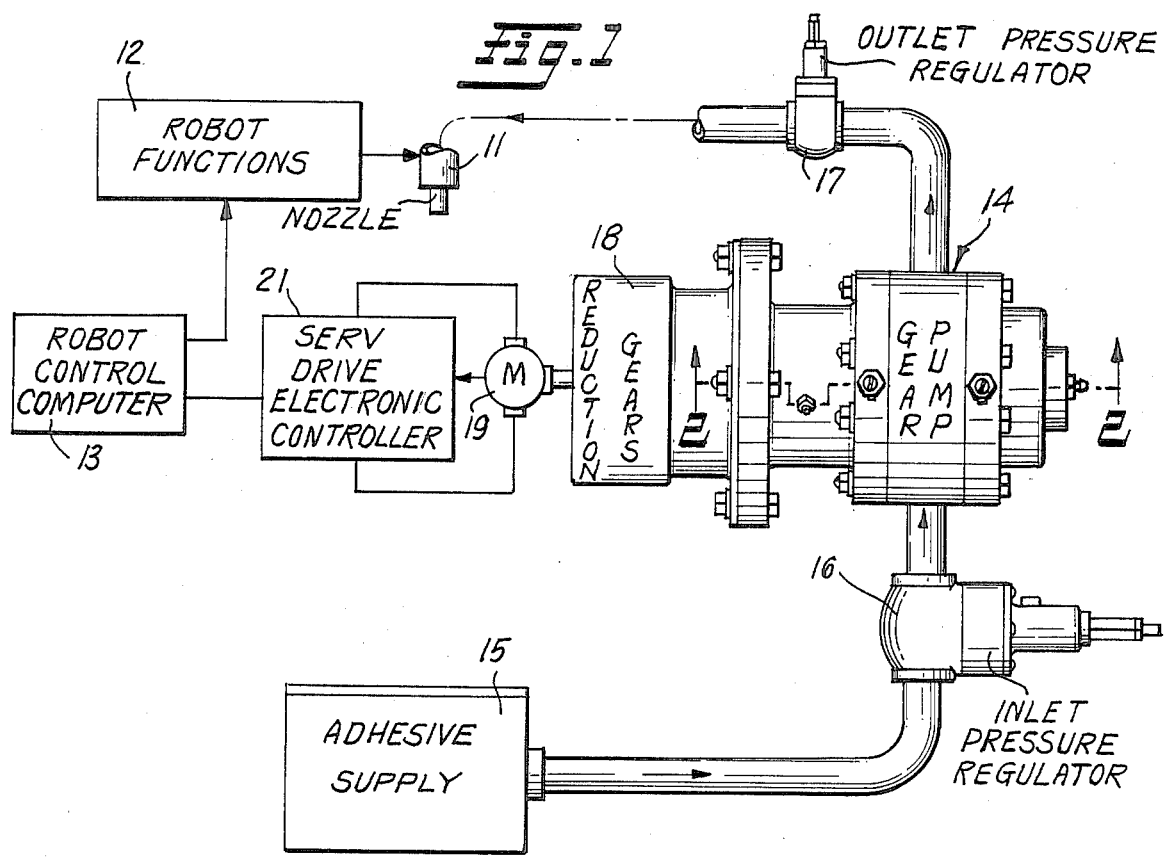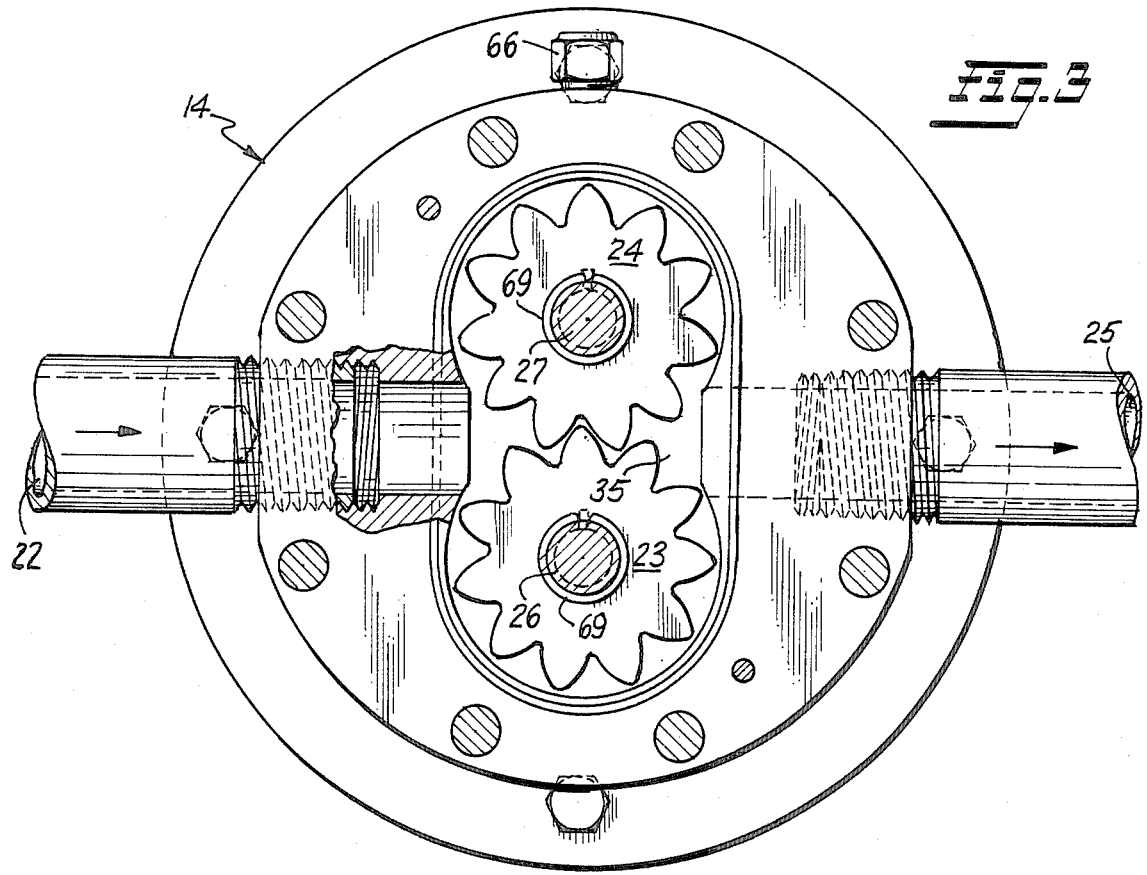

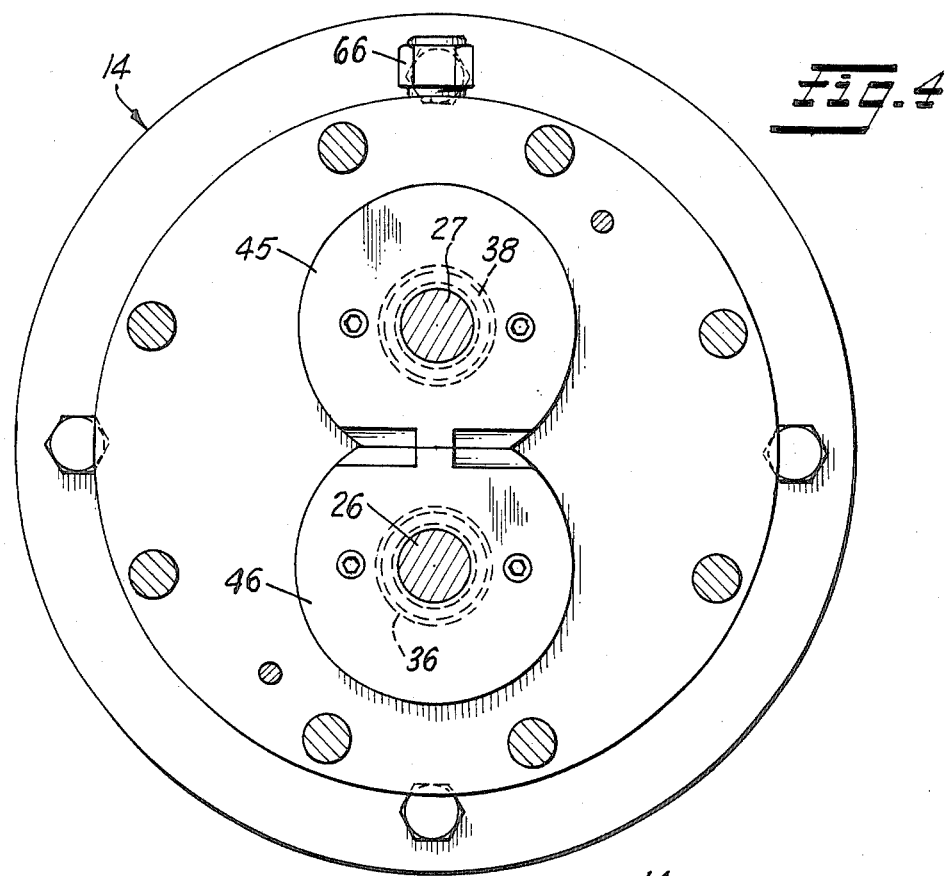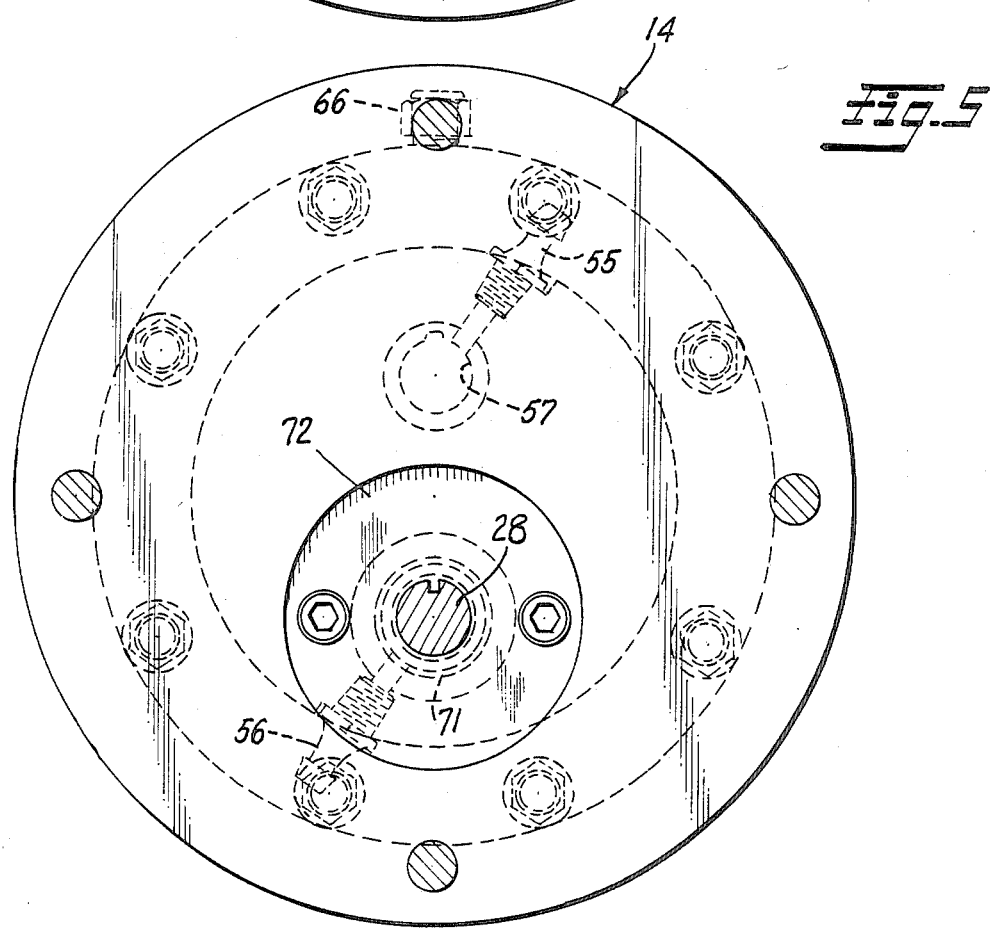

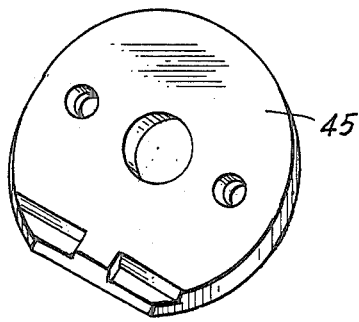
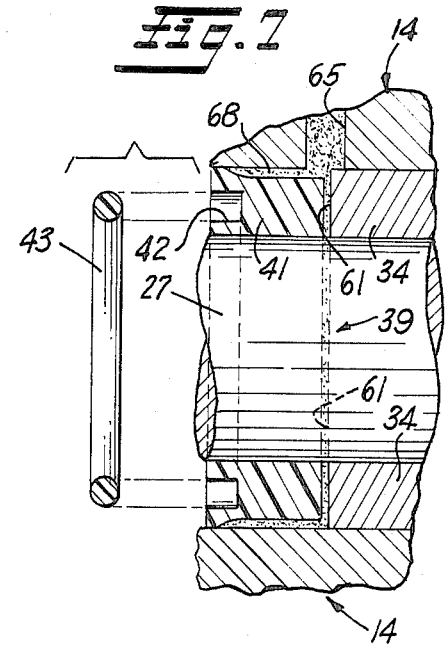
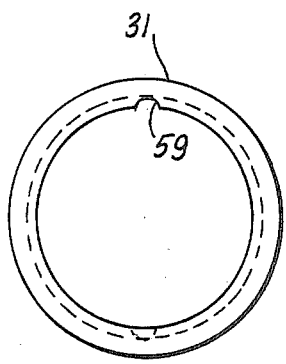
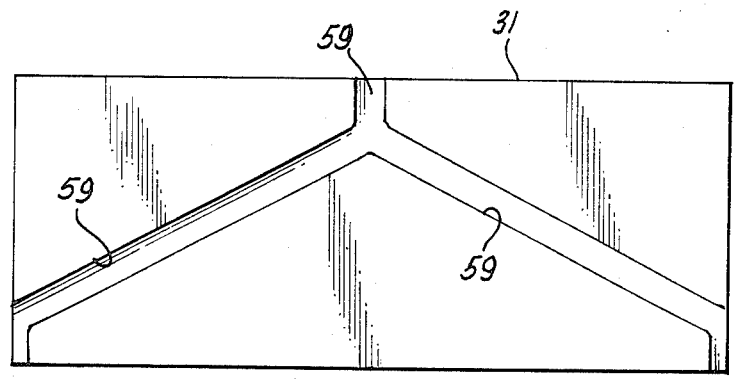

ADHESIVE PUMP AND IT'S CONTROL SYSTEM

FIELD OF INVENTION

This invention relates to a new and improved variable speed pump for pumping adhesive materials which may have a wide range of viscosities and to its control system.

Particularly, the invention relates to a controllable, variable speed, gear pump which is capable of pumping adhesive materials which may be highly viscose and whose viscosity may vary widely with changes in temperature. The adhesive may also be abrasive in nature. The invention also includes an automatic pump control system which enables the adhesive pump to be employed with a robot controlled adhesive dispensing nozzle system used to apply a predesigned bead of adhesive around the surface of a workpiece efficiently and within predefined strict physical specifications.

BACKGROUND OF INVENTION

Robot controlled adhesive dispensing systems must be capable of responding to commands from a robot computer so as to accomplish flow of a controlled amount of adhesive at particular points in the path of travel of the robot positioned dispensing nozzle for the adhesive. A dispensing system without precise control of the flow of highly viscous adhesive at particular points in the travel of the adhesive dispensing nozzle, such as might be supplied by ball valve arrangement, for example, allows the robot controlled adhesive dispenser to dispense adhesive on a workpiece at only one speed. If the robot controlled dispensing nozzle in such an arrangement changes its speed at some point in its travel over the workpiece, then the dispensed bead of adhesive is uneven. Consequently, with such arrangement, the maximum dispensing speed is limited to the speed at which the robot controlled nozzle can traverse corners and other similar quick changes in direction. This is true even though the robot controlled nozzle can travel faster in straight lines. Since the flow rate of the adhesive being dispensed is preset by the ball valve arrangement for the slowest speed (i.e. around corners) at which the robot controlled dispensing nozzle travels, the end result of moving faster would be a very thin bead which is unacceptable in assembly operations. Two prior approaches have been suggested to solve this problem. The first uses a metered shot technique which employs a piston and cylinder arrangement and the second uses a variable orifice to adjust flow rate at particular points in the travel of the robot controlled dispensing nozzle. Neither approach has been satisfactory. To overcome this problem, the present invention has been devised.

SUMMARY OF INVENTION

The present invention utilizes a specially designed gear pump to displace the highly viscous and sometime abrasive adhesive material. Gear pumps are commonly used for fluid pumping applications such as the pumping of oil, water and other low viscosity liquids. The adhesive gear pump comprising the present invention has been specifically designed for very high viscosity adhesives such as epoxies. These adhesives are sensitive to temperature and the pump comprising a part of the present invention does not cause curing of the epoxy adhesive during operation. Additionally, the pump provided by the invention has been found reliable in the presence of highly viscous adhesives which also are very abrasive in nature. The pump is capable of withstanding high pressures of the order of 1500 pounds per square inch gauge at both its input and output.

The pump according to the invention is employed in a nozzle adhesive dispensing control system which can change the output flow of adhesive so as to conform it to the speed of the robot controlled, adhesive dispensing nozzle. This novel system can provide faster flow rates for the adhesive being dispensed while being traced along straight lines. Then at corners where the robot controlled dispensing nozzle must slow down, the flow rate is decreased in synchronization with the change in speed of the dispensing nozzle. This approach allows the average speed of the robot to increase and provides substantial operating advantages in factory environments. In a typical application, a production rate using the invention was increased by 26% over that of known prior art adhesive dispensing arrangements.

A second significant object of the invention is to provide required flow rates for highly viscous adhesive in an environment of changing temperatures. Adhesives are known to change their viscosity with changes in ambient temperature. In tne ball valve example briefly discussed above, an increase in temperature would actually increase the flow rate due to the reduced viscosity of the adhesive. The gear pump approach provided by the present invention dispenses a particular amount of adhesive for each revolution of the gear pump rotors. While there may be some leakage (flow-by) through the pump, such leakage is minimal and the adhesive gear pump provided by the invention provides relatively consistent flow control over plus or minus 50% change in viscosity due to temperature changes.

In practicing the invention, an adhesive pump is provided which comprises a pump housing defining a pump cavity having at least one inlet port and one outlet port. Rotatable pump impellers (preferably intermeshing gear pump rotors) are supported within the pump cavity for physically pumping adhesive supplied thereto through the inlet port to the outlet port at a flow rate dependent upon the rotational speed of the pump impellers. The pump impellers are secured to and rotatable with pump shafts which are rotatably supported in shaft bearings secured within the pump housing. Sealing means are disposed around the shafts intermediate the bearings in the pump cavity for preventing adhesive materials being pumped from leaking along the shaft from the pump impeller into the bearings. The pump housing includes at least one grease lubricant supply chamber. The chambers have grease supply passageways interconnecting the chambers to high pressure inlet one-way valve fittings on the exterior of the pump housing for supplying grease lubricant to the chambers under pressure. The pump housing further includes interconnecting passageways from the lubricant supply chambers to and around the shaft bearing surfaces to the sealing means for lubricating the bearings and supplying the sealing means with grease lubricant to thereby increase and maintain the sealing action of the seals relative to the pump shafts at the ends thereof adjacent the pump cavity. In this manner ingress of the highly viscous and sometimes highly abrasive adhesive into the bearing surfaces is prevented.

In preferred embodiments of the invention, the pump housing further includes additional grease lubricant outlet passageways interconnecting the sealing means to outlet relief valves on the exterior of the pump housing whereby the lubricant grease periodically can be flushed out of the housing lubricant chambers and passageways and replaced with fresh lubricant grease under pressure.

The improved adhesive pump described briefly above is employed in a novel adhesive pump system for automatically changing the flow rate of adhesives being supplied to a workpiece in conformance with changes in movement of a robot controlled adhesive dispensing nozzle used to apply a predesigned bead of adhesive around the surface of a workpiece. The improved pump system comprises an adhesive pump having the features described above for supplying adhesive material to a dispensing nozzle mounted on and moved by a robot dispensing machine over a preprogrammed path of movement to thereby dispense a bead of adhesive in a predetermined pattern onto the workpiece. The adhesive pump is driven by a variable speed electro servo drive motor that in turn is controlled by a servo drive electronic motor controller coupled to and controlling the speed of the servo drive motor. The robot dispensing machine has a programmable control computer for controlling the movement of the robot controlled adhesive dispensing nozzle in tracing out the predesigned bead of adhesive being dispensed. The servo drive electronic motor controller for the adhesive pump motor also is controlled by the control computer of the robot dispensing machine in conjunction with the movement of the adhesive dispensing nozzle whereby the speed of the adhesive pump is synchronized with the movement of the adhesive dispensing nozzle.

BRIEF DESCRIPTION OF DRAWINGS

These and other objects, features and many of the attendant advantages of this invention will be appreciated more readily as the same becomes better understood from a reading of the following detailed description, when considered in conjunction with the accompanying drawings, wherein like parts in each of the several figures are identified by the same reference characters, and wherein:

FIG. 1 is a schematic, functional block diagram of a novel adhesive pump system contructed according to the present invention;

FIG. 3 is an transverse sectional view, on a smaller scale, taken substantially along the line 3—3 of FIG. 2;

FIG. 4 is a transverse sectional view, taken substantially along the line 4—4 of FIG. 2;

FIG. 5 is a end view, partly in section, taken along the line 5—5 of FIG. 2;

FIG. 6 is a perspective view of the replaceable wear plate comprising a part of the gear pump shown in sectional view in FIG. 2;

FIG. 7 is an enlarged exploded sectional view of a shaft sealing member employed in the adhesive gear pump comprising a part of the invention;

FIG. 8 is an enlarged end view of a shaft bearing employed in the adhesive gear pump of the invention; and FIG. 9 is a developed view of the shaft bearing surface of the bearing whose end view is illustrated in FIG. 8; and shows the internal grooves provided for the passage of lubricating grease over and around the bearing and into the sealing member of FIG. 7.

BEST MODE OF PRACTICING INVENTION

Figure 2:
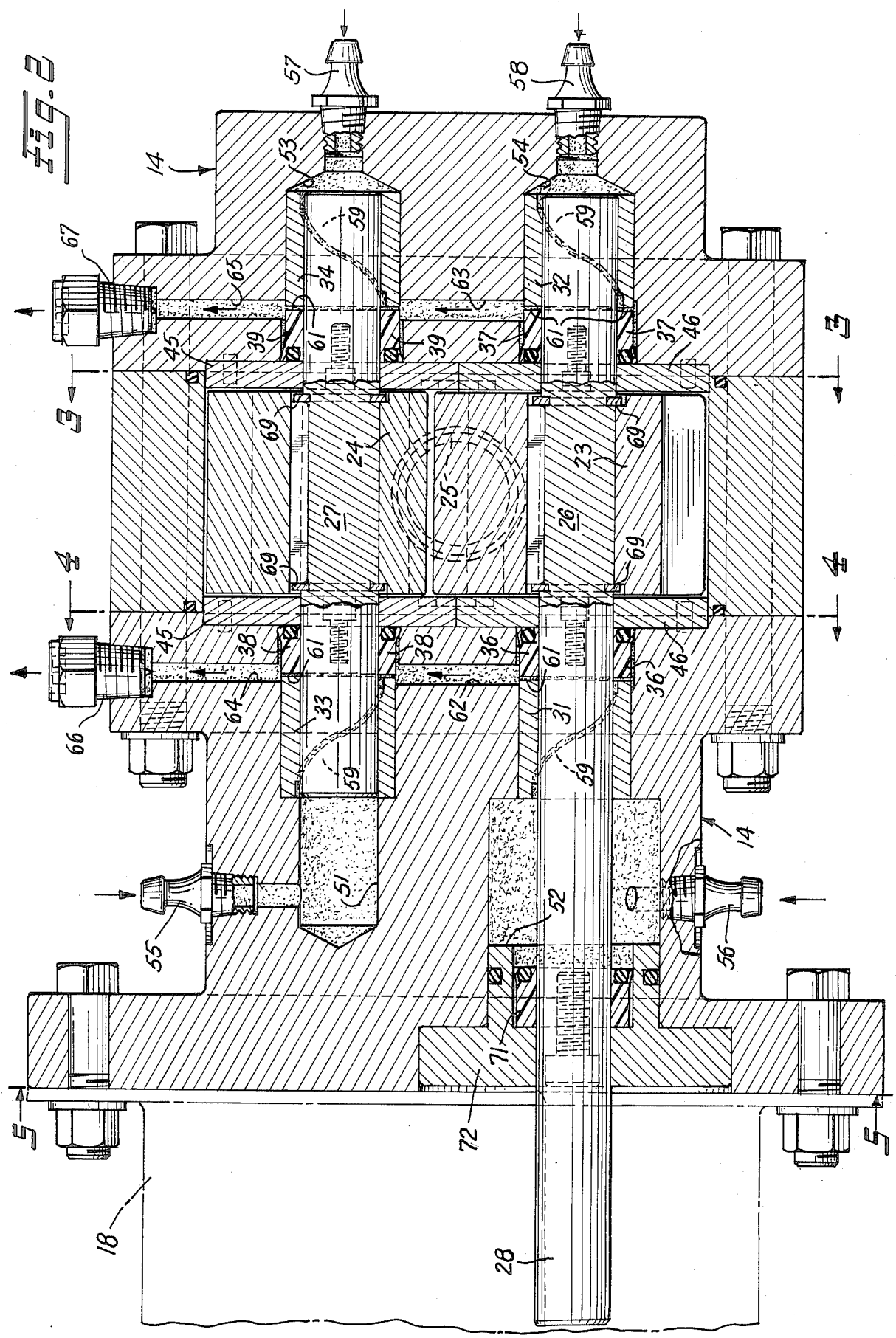
FIG. 2 is an enlarged, longitudinal, sectional view taken through the adhesive gear pump shown in FIG. 1 substantially along the staggered section line 2—2 of FIG. 1.

FIG. 1 is a schematic functional block diagram of an improved adhesive pump control system for automatically changing the flow rate of adhesive materials being dispensed onto a workpiece in conformance with changes in movement of a robot controlled adhesive dispensing nozzle used to apply the adhesive materials onto the surface of the workpiece. In FIG. 1 the robot controlled nozzle is shown at 11 which is secured to the end of a working arm of a robot mechanism shown at 12 that in turn is under the control of a programmable robot control computer 13. The nozzle 11 is designed to dispense a bead of adhesive, such as an epoxy, over a workpiece (not shown). A typical workpiece might comprise the door of an automobile (for example) where it is desired to dispense a bead of adhesive around the outside perimeters of the door prior to assembly. During the dispensing of the adhesive on the door, the speed of the robot must change when the dispensing nozzle reaches points in its path of travel where it must go around corners (particularly sharp corners). Hence, at such points the robot must slow down. When the robot changes its speed at the corners, the flow rate of the adhesive being dispensed by the nozzle must change so as to provide a proper bead pattern on the door panel. The system according to the invention is controlled so that the same control computer 13 which controls positioning of the adhesive dispensing nozzle 11 via robot mechanist 12 also accomplishes rhe task of adjusting the flow rate of the adhesive material being dispensed to provide an even bead throughout the coating operation.

For the above briefly described purpose, the adhesive pump control system according to the invention includes a novel adhesive gear pump 14 (to be described more fully hereinafter with relation to FIGS. 2-9) that is supplied with a highly viscous adhesive material which also may be abrasive. The adhesive to be dispensed is supplied from a supply tank 15 through an inlet pressure regulator 16 to an inlet port of the gear pump 14. The outlet port from the gear pump 14 is supplied through an optional back pressure regulator 17 to the robot controlled dispensing nozzle 11. In systems where the outlet pressure regulator 17 is employed to control the outlet pressure from the gear pump 14, it has been determined that providing a constant output pressure on the gear pump results in superior flow control of the adhesive being dispensed due to the fact that the gear pump is much less sensitive to changes in material viscosity. Recorded data suggests that pumping flow rate error due to changes in viscosity can be reduced from 16% to 5% using the back pressure regulator. For systems where extreme changes in viscosity due to changes in termperature, etc., do not occur, then the inclusion of the outlet pressure regulator 17 is not required. In such systems, the outlet port from the gear pump 14 would be connected directly through suitable conduits to the robot controlled dispensing nozzle 11.

The gear pump 14 is driven through suitable reduction gears shown at 18 that are driven from a servo motor 19 under the control of a servo drive electronic controller 21. The servo drive electronic controller 21 in turn is controlled by the robot control computer 13 in conjunction with the robot mechanism 12. Consequently, changes in movement of the robot mechanism required to position the dispensing nozzle 11 at a particular point in its path of travel, are synchronized with changes in speed of the servo motor 19 and hence the gear pump 14 whereby the flow rate of an adhesive material being dispensed is changed automatically with changes in movement of the adhesive dispensing nozzle 11.

In the above briefly described system, control signals from the robot computer 13 are fed to the robot mechanism 12 to move the adhesive dispensing nozzle 11 to a predetermined point in its path of travel over a workpiece. Concurrently, corresponding commands from the robot control computer 13 are fed to the servo drive electronic controller 21 and the electronic controller output provides necessary control power to the servo drive motor 19. The servo motor speed thus is caused to conform to the pattern of movement of the adhesive dispensing nozzle 11. Output from servo motor 19 is transmitted to the gear pump 14 by speed reducing gears 18 so as to provide necessary torque to the gear pump 14. In this manner, the output from the gear pump provides a flow of adhesive material whose flow rate is under the direct control of the robot control computer 13 and matched to the pattern of movement of the dispensing nozzle 11.

FIG. 2 is a longitudinal sectional view of the adhesive gear pump 14 taken along staggered line 2—2 of FIG. 1. The gear pump 14 has been designed to pump adhesives, which in many cases are extremely viscous and abrasive at a variably controlled flow rate determined by control computer 13. Because of the characteristics of the adhesive material being pumped, it is necessary that gear pump 14 be specially designed to prevent ingress of the adhesive into the bearings of the pump. For this purpose, the pump 14 is provided with a unique seal and lubrication system designed into the pump housing and related to the gears, the shafts, the seals, replaceable wear plates and the bearings as will be described hereinafter.

As best shown in FIG. 3, adhesive to be dispensed enters the pump inlet port 22 at a regulated input pressure from inlet regulator 16 and, comes into contact with the intermeshing gear pump rotors or impellers 23 and 24. Impellers 23 and 24 are rotatably suported in a pump cavity 35 within housing 14, and force the adhesive out through the outlet port 25 under increased pressure which may or may not be regulated dependent upon whether the outlet pressure regulator 17 is employed. The flow rate of the adhesive which is highly viscous and may be somewhat abrasive is determined by the speed of rotation of the intermeshing gear pump impellers 23 and 24 which in turn is dependent upon the speed of the servo motor 19 as explained above.

As best shown in FIG. 2, the gear pump impellers 23 and 24 are keyed to and rotate with respective parallel drive shafts 26 and 27 wherein the drive shaft 26 is coupled to and rotatably driven by a drive shaft 28 from the reducing gears 18. Drive shaft 28 is in axial alignment with the rotor drive shaft 26 and is secured thereto by a suitable coupling such as a threaded stud on the end of rotor drive shaft 26 and received in a complementary threaded socket opening in the end of reduction gearing drive shaft 28. The drive shaft 27 constitutes an idler shaft within the gear pump housing 14 and is driven by main drive shaft 26 via intermeshing gear impellers 23, 24.

The gear pump impeller drive shafts 26 and 27 are rotatably supported in parallel alignment within gear housing 14 by suitable journal bearings shown at 31, 32, 33 and 34. To prevent egress of the adhesive material being pumped out of the pump cavity 35 within which the gear pump impellers 23 are supported, as best seen in FIG. 3, and thereafter leach or otherwise be forced out along the drive shafts 26 and 27 into the space between the respective drive shafts and their supporting journal bearings 31, 32 and 33,34, four Parker Poly-Pak seals are provided as shown at 36, 37 and 38, 39. The construction of Poly-Pak seals 36, 37 and 38, 39 is shown in greater detail in FIG. 7. The seals 36 and 37 are positioned around the rotor impeller drive shaft 26 at each end thereof outside the walls of the cavity 35 through which the adhesive is being pumped passes, and are disposed intermediate the bearings 31 and 32 and the respective ends of the pump impeller-rotor 24. Similarly, the pump impeller drive shaft 27 has the seals 38 and 39 disposed therearound at positions intermediate the bearings 33 and 34 and the respective ends of the pump impeller-rotor 23.

FIG. 7 is an enlarged cross sectional view of the construction of one of the poly-pak seals 36, 37, 38 and 39. Since the seals are identical in construction, only seal 39 has been illustrated. The poly-pak seals are comprised by an annular, tapered body member 41 of pliable resilient plastic material which is press fitted over the end of the shaft 27 at a position intermediate the journal bearing 34 and the wall portion of the housing 14 which defines the pump cavity 35 in which the gear pump impellers 23 and 24 are rotatably supported. The tapered annular resilient plastic member 41 has an annular-shaped groove shown at 42 formed around the end thereof and a resilient O-ring seal 43 is press-fit into this groove in order to enhance the gripping ability of the seal member 41 to the interior surrounding surface of housing 14 and to enhance sealing of the surface of the shaft 26 which it surrounds. The remaining poly-pak seals 36, 37, and 38 are similarly constructed and all four poly-pak seals are arranged with the enlarged diameter end thereof containing the O-ring seal 43 pressed against the end surface of the cavity housing through which shaft 26, or alternatively shaft 27, passes.

As best shown in FIG. 4 of the drawings, each of the end faces of the pump cavity housing through which the shafts 26 and 27 pass have circular depressions formed therein in which annular, soft brass wear plates 45 and 46 are secured at each end of each shaft. The wear plates 45, 46 together with a similar pair of wear plates at the opposite end of the pump cavity form wear surfaces coacting with the respective ends of the gear pump impellers 23 and 24 for containing the adhesive within the pump cavity 35. FIG. 6 is a perspective view of one of the replaceable wear plates, such as 45.

The pump housing 14 has a plurality of grease lubricant supply chambers formed therein best see in FIG. 2 at 51, 52, 53 and 54. These chambers are connected by interconnecting passageways to respective high pressure inlet, one-way valve grease fittings shown at 55, 56, 57 and 58, respectively, for supplying lubricant grease under high pressure to each of the respective supply chambers. The inlet one-way valve fittings 55, 56, 57 and 58 are standard grease fittings and are mounted on the exterior of the housing 14 so as to be readily accessible to a serviceman for replenishing the lubricant grease supply in the respective supply chambers.

Lubricant grease from each of the respective supply chambers is supplied to bearings 31, 32, 33, 34 through grease lubricating passageways shown at 59 in FIG. 2 formed in the surface of the respective journal bearings 31, 32, 33 and 34. FIG. 8 is an enlarged end view of one of the shaft bearings 31, for example, which illustrates clearly a groove 59 formed in the surface of the bearing for the supply of lubricant grease to the shaft and bearing in which it is formed. FIG. 9 is a developed view of the journal bearing 31 shown in FIG. 8 and best illustrates how lubricant grease supplied through the passageways 59 of the respective bearings serves to maintain the shaft and bearing surfaces well lubricated with grease so as to minimize friction and wear and prevent ingress of adhesive into the space between the shaft and the bearing.

The grooved passageways 59 in all of the bearings 31, 32, 33 and 34 terminate at a small gap shown at 61 between the ends of the respective bearings 31, 32, 33 and 34 and the abutting ends of their respective poly-pak seal units 36, 37, 38 and 39. Interconnecting high pressure lubricant passageways shown at 62, 63, 64 and 65 serve to interconnect all of the gaps 61 of both shafts 26 and 27 together in a common lubricant supply system with the passageways 64 and 65 being interconnected with respective high pressure outlet relief valves 66 and 67 threaded into the outer surface of the pump casing 14. With this arrangement, lubricant grease is supplied by a suitable grease gun through the respective grease inlet one-way valves 55, 56, 57 and 58 where it is built up in the supply chambers 51, 52, 53 and 54. From the supply chambers, the grease is forced through the lubricating passageways 59 in the respective journal bearing shell to the gaps 61 and to and through the interconnecting passageways 62, 63, 64 and 65.

As best seen in FIG. 7, the gaps 61 also communicate with small gaps shown at 68 which exist between the outer tapered surface of the resilient sealing members 41 of all the poly-pak seals 36, 37, 38 and 39 such as the seal 39, for example. As a result of this interconnection, lubricant grease is forced through the bearing passageways 59, through the gaps 61 and into and around the bulk of the exterior tapered surfaces of the poly-pak seal members 41. Consequently, any adhesive which might tend to leak out of the pump cavity through the central openings in the replaceable wear plates and the end wall of the portion of the pump housing supporting the wear plates and defining the pump cavity, is prevented from further travel along the shaft and into the bearings by the incompressible lubricant grease filling the gaps and coacting with the poly-pak seal members 36, 37, 38 and 39 to prevent ingress of the adhesive into and around the bearings and shafts 26 and 27.

To hold the impellers 23 and 24 in place on shafts 26 and 27, snap rings 69 are provided within the pump cavity at each end of the pump impeller shafts as best shown in FIG. 2. The snap rings 69 are of conventional construction. Also to assure proper sealing of the pump unit at its point of connection to the reduction gearing 18, an additional poly-pak seal unit 71 is provided in a cup-shaped removable plate 72 best seen in FIG. 2 and FIG. 5 of the drawings. Plate 72 provides an access opening to the internally threaded end of shaft 26 whereby the shaft 28 of the reduction gear 18 readily may be secured to the drive shaft 26 of the pump unit.

When placing the novel adhesive gear pump provided by the invention in operation, the lubricant grease system is filled with lubricant grease to a pressure of the order of 1000 pounds per square inch guage. Because of the improved sealing action provided oy the poly-pak seal units 36, 37, 38 and 39 the high pressure grease is confined to the lubrication system and its interconnecting passageways and prevented from entering into the pump cavity. Thereafter, when the pump is operated and adhesive is being pumped under pressure, the lubricant grease already has filled any possible leakage paths existing in spaces on the lubricant side of the pump cavity 35 adhesive is prevented from leaking out of the pump cavity. After several months of operation, it is desirable to shut down the pump for periodic servicing, loosen the screws in the outlet relief valves 66 and 67 in the pump housing, and thereafter pump out the old lubricant grease and replace it with new fresh lubricant grease on a systematic maintenance schedule to assure long-term reliable operation of the pump in service.

From the above description it is clear that the adhesive pumping system is designed primarily for the dispensing of single part adhesives at ambient temperature. However, hot melt liquid adhesives can be dispensed at elevated temperatures, which upon cooling provide solid structural bonding. While using hot melts, the improved pumping system controls the dispensed flow rate of the hot melt adhesive synchronously with the movement of the adhesive dispensing nozzle in the manner described earlier. This can be accomplished by heating the pump unit in a high temperature chamber. Such arrangement also can be used to stabilize the temperature of any adhesive being dispensed to thereby stabilize the viscosity of the adhesive at a desired value.

Additionally, the adhesive pumping system provided by the invention is not limited to use with single-part adhesives, but also can be employed with a class of adhesives called two-part adhesives which are commonly known. Two-part adhesives, however, require precise mixing prior to application on the workpiece where they cure due to a chemical reaction. The mixing must be achieved subsequent to the pump unit. Hence, two separate systems employing a separate nozzle for each part of the two-part adhesive can be used. In such arrangement the second nozzle dispenses its part over the bead traced out by the first part. The two-part mixture otherwise is dispensed in the manner described above with respect to single part adhesives.

INDUSTRIAL APPLICABILITY

The present invention provides a computer programmable, positive displacement pumping system which employs a novel adhesive dispensing pump for dispensing adhesive at selectively controlled flow rates. In a typical installation the pumping system automatically dispenses adhesive on a part, such as an automotive door, with a robot controlled nozzle. During the dispensing of the adhesive onto the door, the speed of the robot controled nozzle must change at different points in its travel, for example, around corners where the robot controlled nozzle must slow down. As the robot changes its speed, the flow rate of the adhesive also is changed so as to provide a proper adhesive bead pattern on the part being processed. The same control computer controls both the motion of the rooot adhesive dispensing nozzle and the flow rate of the pump supplying the adhesive to be dispensed.

The invention employs a new and improved adhesive gear pump for displacing the adhesive material to be dispensed. The gear pump of the invention has been specifically designed for very high viscosity adhesives, such as epoxies, which are sensitive to temperature and sometimes can be very abrasive. With such adhesives, the improved pump does not cause curing of the adhesive during operation.

In summary, the novel adhesive pumping system provided by the invention provides the following features:

1. Programmable positive displacement flow control of the adhesive being dispensed.
2. Flow rate relatively insensitive to changes in viscosity due to changes in temperature.
3. Adhesive has negligible temperature rise from the adhesive pump output to the nozzle (about 2 degrees Fahrenheit).
4. Pump is abrasive resistant so as to provide long operating life under expected factory operating conditions.
5. System provides faster adhesive dispensing times due to the ability to increase flow rates on straight-line beads while automatically providing slower flow rates at corners or other turns where the dispensing nozzle must slow down.

Having described one embodiment of a novel high input and high output pressure adhesive pump and control system therefor constructed in accordance with the invention, it is believed obvious that other modifications and variations of the invention will be suggested to those skilled in the art in the light of the above teachings. It is therefore to be understood that changes may be made in the particular embodiment of the invention described which are within the full intended scope of the invention as defined by the appended claims.

What is claimed is:

1. An adhesive pump comprising a pump housing defining a pump cavity having at least one inlet port and one outlet port, rotatable pump impeller means supported within the pump cavity for physically pumping adhesive supplied thereto through the inlet port to the outlet port at a flow rate dependent upon the rotational speed of the pump impeller means, said pump impeller means being secured to and rotatable with at least one rotatable pump shaft, shaft bearing means secured within said pump housing for rotatably supporting the pump impeller shaft, lubricant pressure aided shaft sealing means disposed around the shaft intermediate the bearing means and the pump cavity for preventing leakage of the adhesive materials being pumped along the shaft from the pump cavity into the bearings, said pump housing including at least one pressurized lubricant supply chamber having lubricant supply passageways interconnecting the chamber to high pressure inlet one-way valve fittings on the exterior of the pump housing for supplying lubricant thereto under pressure, and said pump housing further including interconnecting passageways from the high pressure lubricant supply chamber to and around the shaft bearing surfaces to the lubricant pressure aided shaft sealing means for supplying the shaft sealing seans with lubricant under pressure for increasing and maintaining the sealing action of the shaft sealing means relative to the pump shaft at the end thereof adjacent the pump cavity.

2. An adhesive pump acording to claim 1 further including additional grease lubricant outlet passageways interconnecting the shaft sealing means to relievable outlet valve means on the exterior of the pump housing whereby the lubricant periodically can be flushed out of the housing lubricant chamber and passageways and replaced with fresh lubricant under pressure.

3. An adhesive pump according to claim 1 wherein the interconnecting passageways from the lubricant supply chamber to and around the shaft bearing inside surfaces includes grooved passageways formed in the inside surfaces of the bearing that support the pump impeller drive shaft whereby lubricant under pressure continuously is supplied to that portion of the pump impeller drive shaft supported within the bearings to insure a well lubricated surface lubricant under pressure that further prevents ingress of the adhesive being pumped into the space between the rotating impeller shaft and the bearing surface.

4. An adhesive pump according to claim 2 wherein the interconnecting passageways from the lubricant supply chamber to and around the shaft bearing surfaces includes grooved passageways formed in the inside surfaces of the bearing that support the pump impeller drive shaft whereby lubricant under pressure continuously is supplied to that portion of the pump impeller drive shaft supported within the bearings to insure a well lubricated surface lubricant under pressure that further prevents ingress of the adhesive being pumped into the space between the rotating impeller shaft and the bearing surface.

5. An adhesive pump according to claim 1 wherein the shaft sealing means includes an annular, pliable, tapered resilient sealing member having a U-shaped cross section at the enlarged end thereof closed by an O-ring with the open face of the U-shaped cross section end of the sealing member and O-ring facing the back wall of the adhesive containing cavity and wherein lubricant under pressure is driven into the smaller diameter end of the tapered resilient sealing member to cause it to firmly grip and seal the shaft in the space between the rotating pump impeller and the sealing member.

6. An adhesive pump according to claim 4 wherein the shaft sealing means is disposed between the bearing scans and the back side of the housing wall that defines the pump cavity, the shaft sealing means includes annular, pliable, tapered resilient sealing members having a U-shaped cross section at the enlarged end thereof closed by an O-ring with the open face of the U-shaped cross section end of the sealing members and contained O-rings being disposed opposite and facing the back side of the pump housing wall whose opposite surface forms one surface of the pump cavity and wherein lubricant under pressure is driven into the tapered surface of the tapered resilient sealing member under pressure to cause it to firmly grip the shaft and seal the space between the rotating pump impeller shaft and the sealing member.

7. An adhesive pump according to claim 1 wherein the rotatable pump impeller means comprises a set of intermeshing gear wheels that form a gear pump.

8. An adhesive pump according to claim 6 wherein the rotatable pump impeller means comprises a set of intermeshing gear wheels that form a gear pump.

9. An adhesive gear pump comprising a pump housing defining a pump cavity having an inlet port and outlet port, a pair of intermeshing gear pump rotors supported within the pump cavity for physically pumping adhesive materials flowing through the inlet port to the outlet port at a flow rate dependent upon the rotational speed of the gear pump rotors, said gear pump rotors being secured to and rotatable with the respective gear pump rotor drive shafts, drive shaft bearing means secured within said pump housing for rotatably supporting the respective gear pump rotor drive shafts, lubricant pressure aided shaft sealing means disposed around each of the drive shafts intermediate the respective bearing means and the pump cavity for preventing leakage of the adhesive materials being pumped from leaking along the shafts from the respective gear pump rotors into their respective drive shaft supporting bearings whereby adhesion to and erosion of the bearings by the adhesive materials is prevented, said pump housing including at least one pressurized lubricant supply chamber having lubricant supply passageways interconnecting the chamber to high pressure inlet one-way valve fittings on the exterior of the pump housing for supplying lubricant thereto under pressure, and said pump housing further including interconnecting passageways from the pressurized lubricant supply chamber to and around the shaft bearing surfaces to the lubricant pressure aided shaft sealing means for pressurizing the shaft sealing means with lubricant for increasing and maintaining the sealing action of the sealing means relative to the pump shaft at the end thereof adjacent the pump cavity.

10. An adhesive pump according to claim 9 further including additional lubricant outlet passageways interconnecting the shaft sealing means to relievable outlet valve means on the exterior of the pump housing whereby the pressurized lubricant periodically can be flushed out of the housing lubricant chambers and passageways and replaced with fresh lubricant under pressure.

11. An adhesive pump according to claim 10 wherein the interconnecting passageways from the lubricant supply chamber to and around the shaft bearing surfaces include grooved passageways formed in the surfaces of the bearing that support the pump impeller drive shaft whereby lubricant under pressure continuously is supplied to that portion of the pump impeller drive shaft supported within the bearings to insure a well lubricated surface that further prevents ingress of the adhesive being pumped from leaking into the space between the rotating impeller shaft and the bearing surface.

12. An adhesive pump according to claim 11 wherein the shaft sealing means includes an annular, pliable, tapered, resilient sealing member having a U-shaped cross section at the enlarged end thereof closed by an O-ring with the open face of the enlarged end of the U-shaped cross section of the tapered resilient sealing member and O-ring being disposed opposite and facing the back side of the wall portion of the pump housing whose opposite surface forms one surface of the pump cavity and wherein high pressure lubricant is driven into the tapered end of the tapered resilient sealing member to cause it to firmly grip and seal the shaft in the space between the rotating pump impeller and the sealing member.

13. An adhesive pump according to claim 12 wherein the shaft sealing means is disposed between the bearing means and the side of the pump housing supporting the wear plate in the pump cavity, the shaft sealing means includes an annular, pliable, tapered, resilient sealing member having a U-shaped cross section at the enlarged end thereof closed by an O-ring with the open face of the U-shaped cross section of the enlarged end of the tapered sealing member being disposed opposite and facing the back side of the wall portion of the housing defining the pump cavity and wherein high pressure lubricant is driven into the tapered end of the tapered resilient sealing member to cause it to firmly grip and seal the shaft in the space between the rotating pump impeller and the sealing member.

* * * * *